United States Patent [19]
Abe

[11] Patent Number: 5,805,737
[45] Date of Patent: Sep. 8, 1998

[54] IMAGE SIGNAL COMPRESSING DEVICE

[75] Inventor: Nobuaki Abe, Sapporo, Japan

[73] Assignee: Asahi Kogaku Kogyo Kabushiki Kaisha, Tokyo, Japan

[21] Appl. No.: 854,803

[22] Filed: May 12, 1997

Related U.S. Application Data

[63] Continuation of Ser. No. 454,858, May 31, 1995, abandoned.

[30] Foreign Application Priority Data

May 31, 1994 [JP] Japan .................................. 6-140865

[51] Int. Cl.⁶ ...................................................... G06K 9/00
[52] U.S. Cl. ............................................. 382/246; 382/239
[58] Field of Search ..................................... 382/155, 159,
382/232, 233, 234, 235, 239, 240, 241,
244, 245, 246, 248, 250, 251, 252, 253,
270, 276, 277, 278, 279, 280; 358/433,
427, 261.1, 426, 539, 298, 429, 454, 459,
533, 534; 348/397

[56] References Cited

U.S. PATENT DOCUMENTS 5,086,488 2/1992 Kato et al. .................................. 382/56
5,196,946 3/1993 Balkanski et al. ...................... 358/433

OTHER PUBLICATIONS

"Digital Compression and Coding of Continuous–tone Still Images, Part 1: Requirements and Guidelines" By ISO/IEC, Ch–I–K, (1991–Mar.–15), (France, Afnor).

Primary Examiner—Leo H. Boudreau
Assistant Examiner—Bijan Tadayon
Attorney, Agent, or Firm—Greenblum & Bernstein, P.L.C.

[57] ABSTRACT

An image signal compressing device has a quantization processing circuit in which DCT coefficients are quantized using a quantization table, and thus, quantized DCT coefficients are obtained. In a Huffman table selection unit, a Huffman table is generated in accordance with a Huffman code length table, which is determined in accordance with the minimum value of the quantization coefficients forming the quantization table. In a Huffman encoding process circuit, the quantized DCT coefficients are Huffman-encoded. The maximum value of the table number of the Huffman code length table is small, as the minimum value of the quantization coefficient is large.

15 Claims, 18 Drawing Sheets

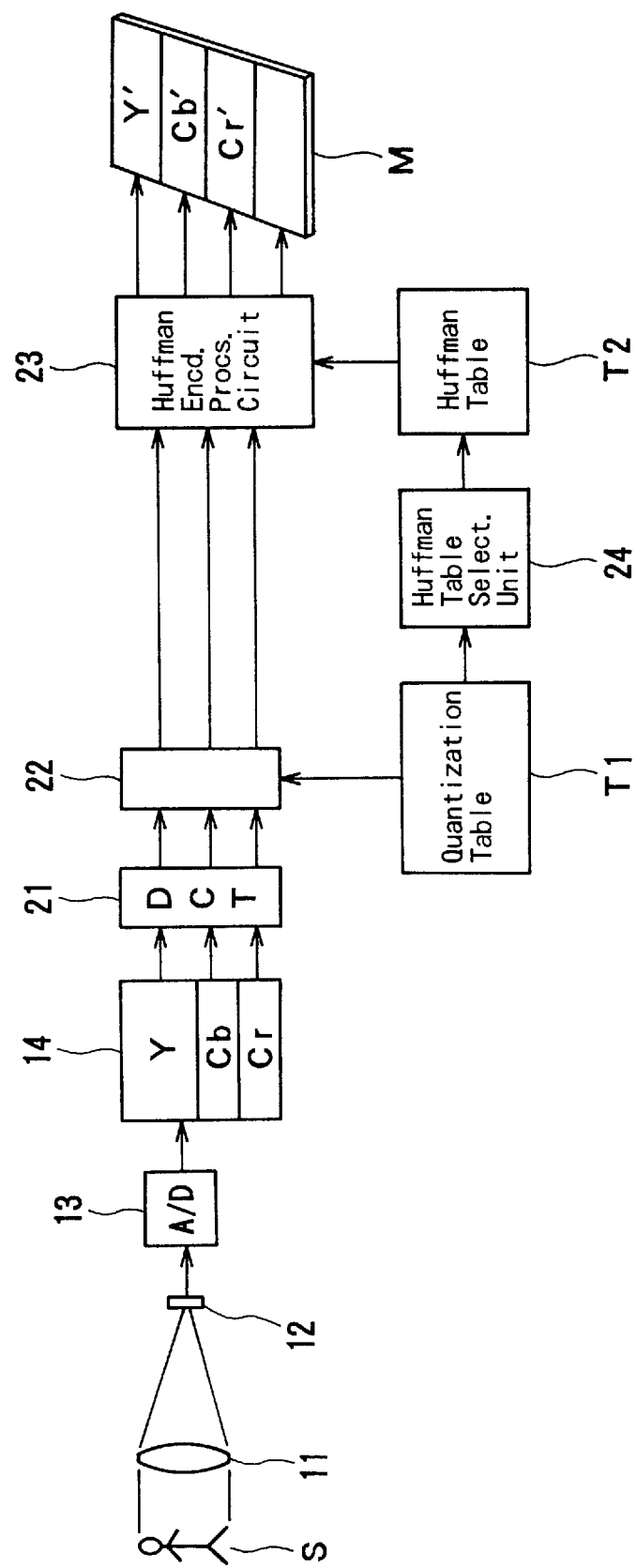

Fig. 2

8 × 8 PIXEL BLOCK $$P(Y)xy = \begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{bmatrix}$$

⇩ DCT $S_{00}$ $S_{10}$ DCT COEFFICIENT
$S_{01}$ $$S(Y)uv = \begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix}$$

$S_{77}$

QUANTIZATION TABLE $$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

⇩ QUANTIZE ← $Q(Y)uv$ =

$R_{00}$ QUANTIZED DCT COEFFICIENT $$R(Y)uv = \begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Fig. 3

GROUPING OF DIFFERENTIAL VALUES OF DC COMPONENTS

| SSSS GROUP NO. | DC DIFFERENTIAL VALUE | NO. OF ADDED BITS |
|---|---|---|
| 0 | 0 | 0 |
| 1 | -1. 1 | 1 |
| 2 | -3. -2. 2. 3 | 2 |
| 3 | -7.. -4. 4.. 7 | 3 |
| 4 | -15.. -8. 8.. 15 | 4 |
| 5 | -31.. -16. 16.. 31 | 5 |
| 6 | -63.. -32. 32.. 63 | 6 |
| 7 | -127.. -64. 64.. 127 | 7 |
| 8 | -255.. -128. 128.. 255 | 8 |
| 9 | -511.. -256. 256.. 511 | 9 |
| 10 | -1023.. -512. 512.. 1023 | 10 |
| 11 | -2047.. -1024. 1024.. 2047 | 11 |

Fig. 4

ENCODING TABLE FOR DIFFERENTIAL DC COMPONENTS

| SSSS | CODE LENGTH | CODE WORD |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

FOR LUMINANCE COMPONENT

Fig. 7

GROUPING OF AC COMPONENTS

| SSSS GROUP NO. | AC COMPONENT VALUE | NO. OF ADDED BITS |
|---|---|---|
| 0 | 0 | 0 |
| 1 | -1, 1 | 1 |
| 2 | -3, -2, 2, 3 | 2 |
| 3 | -7...-4, 4...7 | 3 |
| 4 | -15...-8, 8...15 | 4 |
| 5 | -31...-16, 16...31 | 5 |
| 6 | -63...-32, 32...63 | 6 |
| 7 | -127...-64, 64...127 | 7 |
| 8 | -255...-128, 128...255 | 8 |
| 9 | -511...-256, 256...511 | 9 |
| 10 | -1023...-512, 512...1023 | 10 |

*Fig. 8*

```
ZZ( )···0 LINE LENGTH:   -   0   0   1   0   2   0   54
EFFECTIVE COEFFICIENT:  16   4  -7   3  -2  -1  -1
         VALUE
DC VALUE(16)-PRIOR DC VALUE(25)=DIFFERENTIAL(-9) SSSS=4
                                    DC VALUE
                                    CODE WORD FOR SSSS→101
                                        ADDED BITS→0110
ZZ01=( 4) SSSS=(3)RUN LENGTH=(0)
                                    CODE WORD FOR SSSS→100
                                        ADDED BITS→100
ZZ02=(-7) SSSS=(3)RUN LENGTH=(0)
                                    CODE WORD FOR SSSS→100
                                        ADDED BITS→000
ZZ04=( 3) SSSS=(2)RUN LENGTH=(1)
                                    CODE WORD FOR SSSS→11011
                                        ADDED BITS→11
ZZ05=(-2) SSSS=(2)RUN LENGTH=(0)
                                    CODE WORD FOR SSSS→01
                                        ADDED BITS→01
ZZ08=(-1) SSSS=(1)RUN LENGTH=(2)
                                    CODE WORD FOR SSSS→11100
                                        ADDED BITS→0
ZZ09=(-1) SSSS=(1)RUN LENGTH=(0)
                                    CODE WORD FOR SSSS→00
                                        ADDED BITS→0
EOB                                 CODE WORD FOR EOB→1010

ENCODED DATA: 1010110100100100000110111101011110000001010
```

HED

```
ZZ( )···0 RUN LENGTH :   -   0   0   1   0   2   0   54
EFFECTIVE COEFFICIENT:  16   4  -7   3  -2  -1  -1
         VALUE
```

Fig. 9A

| R.L./SSSS | C.L. | CODE WORD |
|---|---|---|
| 0/0(EOB) | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 7 | 1111000 |
| 0/7 | 8 | 11111000 |
| 0/8 | 10 | 1111110110 |
| 0/9 | 16 | 1111111110000010 |
| 0/A | 16 | 1111111110000011 |
| 1/1 | 4 | 1100 |
| 1/2 | 5 | 11011 |
| 1/3 | 7 | 1111001 |
| 1/4 | 9 | 111110110 |
| 1/5 | 11 | 11111110110 |
| 1/6 | 16 | 1111111110000100 |
| 1/7 | 16 | 1111111110000101 |
| 1/8 | 16 | 1111111110000110 |
| 1/9 | 16 | 1111111110000111 |
| 1/A | 16 | 1111111110001000 |
| 2/1 | 5 | 11100 |
| 2/2 | 8 | 11111001 |
| 2/3 | 10 | 1111110111 |
| 2/4 | 12 | 111111110100 |
| 2/5 | 16 | 1111111110001001 |
| 2/6 | 16 | 1111111110001010 |
| 2/7 | 16 | 1111111110001011 |
| 2/8 | 16 | 1111111110001100 |
| 2/9 | 16 | 1111111110001101 |
| 2/A | 16 | 1111111110001110 |
| 3/1 | 6 | 111010 |
| 3/2 | 9 | 111110111 |

Fig. 9B

| R.L./SSSS | C.L. | CODE WORD |
|---|---|---|
| 0/0(EOB) | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 7 | 1111000 |
| 0/7 | 8 | 11111000 |
| 0/8 | 10 | 1111110110 |
| 0/9 | 15 | 111111111000000 |
| 0/A | ~~16~~ | ~~1111111110000011~~ |
| 1/1 | 4 | 1100 |
| 1/2 | 5 | 11011 |
| 1/3 | 7 | 1111001 |
| 1/4 | 9 | 111110110 |
| 1/5 | 11 | 11111110110 |
| 1/6 | 15 | 111111111000001 |
| 1/7 | 16 | 1111111110100010 |
| 1/8 | 16 | 1111111110100011 |
| 1/9 | 16 | 1111111110100100 |
| 1/A | ~~16~~ | ~~1111111110001000~~ |
| 2/1 | 5 | 11100 |
| 2/2 | 8 | 11111001 |
| 2/3 | 10 | 1111110111 |
| 2/4 | 12 | 111111110100 |
| 2/5 | 15 | 111111111000010 |
| 2/6 | 16 | 1111111110100101 |
| 2/7 | 16 | 1111111110100110 |
| 2/8 | 16 | 1111111110100111 |
| 2/9 | 16 | 1111111110101000 |
| 2/A | ~~16~~ | ~~1111111110001110~~ |
| 3/1 | 6 | 111010 |
| 3/2 | 9 | 111110111 |

Fig. 10

| Qmin | SELECTED TABLE NO. |
|---|---|
| 1, 2 | 1 |
| 3, 4 | 2 |
| 5~8 | 3 |
| 9~16 | 4 |
| 17~32 | 5 |
| 33~66 | 6 |
| 67~136 | 7 |
| 137~255 | 8 |

Fig. 11

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | 5 | 7 | 8 | 10 | 16 | 16 |
| 1 | — | 4 | 5 | 7 | 9 | 11 | 16 | 16 | 16 | 16 | |
| 2 | — | 5 | 8 | 10 | 12 | 16 | 16 | | | | |
| 3 | — | 6 | 9 | 12 | 16 | 16 | | | | | |
| 4 | — | 6 | 10 | 16 | 16 | | | | | | |
| 5 | — | 7 | 11 | 16 | | | | | | | |
| 6 | — | 7 | 12 | 16 | | | | | | | |
| 7 | — | 8 | 12 | 16 | | | | | | | |
| 8 | — | 9 | 15 | 16 | | | | (16) | | | |
| 9 | — | 9 | 16 | 16 | | | | | | | |
| 10 | — | 9 | 16 | | | | | | | | |
| 11 | — | 10 | 16 | | | | | | | | |
| 12 | — | 10 | 16 | | | | | | | | |
| 13 | — | 11 | 16 | | | | | | | | |
| 14 | — | 16 | 16 | | | | | | | | |
| 15 | 11 | 16 | | | | | | | | | |

Fig. 12

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | 5 | 7 | 8 | 10 | 15 | — |
| 1 | — | 4 | 5 | 7 | 9 | 11 | 15 | 16 | 16 | 16 | — |
| 2 | — | 5 | 8 | 10 | 12 | 15 | 16 | 16 | | | — |
| 3 | — | 6 | 9 | 12 | 15 | 16 | 16 | | | | — |
| 4 | — | 6 | 10 | 15 | 16 | 16 | | | | | — |
| 5 | — | 7 | 11 | 15 | 16 | | | | | | — |
| 6 | — | 7 | 12 | 15 | 16 | | | | | | — |
| 7 | — | 8 | 12 | 15 | 16 | | | | | | — |
| 8 | — | 9 | 15 | 15 | 16 | | | (16) | | | — |
| 9 | — | 9 | 15 | 16 | 16 | | | | | | — |
| 10 | — | 9 | 15 | 16 | | | | | | | — |
| 11 | — | 10 | 15 | 16 | | | | | | | — |
| 12 | — | 10 | 15 | 16 | | | | | | | — |
| 13 | — | 11 | 15 | 16 | | | | | | | — |
| 14 | — | 15 | 16 | 16 | | | | | | | — |
| 15 | 11 | 15 | 16 | | | | | | | | — |

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | 5 | 7 | 8 | 10 | — | — |
| 1 | — | 4 | 5 | 7 | 9 | 11 | 14 | 15 | 16 | — | — |
| 2 | — | 5 | 8 | 10 | 12 | 15 | 15 | 16 | 16 | — | — |
| 3 | — | 6 | 9 | 12 | 15 | 15 | 16 | 16 | | — | — |
| 4 | — | 6 | 10 | 15 | 15 | 16 | 16 | | | — | — |
| 5 | — | 7 | 11 | 15 | 15 | 16 | | | | — | — |
| 6 | — | 7 | 12 | 15 | 15 | 16 | | | | — | — |
| 7 | — | 8 | 12 | 15 | 15 | 16 | | | | — | — |
| 8 | — | 9 | 15 | 15 | 15 | 16 | | | | — | — |
| 9 | — | 9 | 15 | 15 | 16 | 16 | | (16) | | — | — |
| 10 | — | 9 | 15 | 15 | 16 | | | | | — | — |
| 11 | — | 10 | 15 | 15 | 16 | | | | | — | — |
| 12 | — | 10 | 15 | 15 | 16 | | | | | — | — |
| 13 | — | 11 | 15 | 15 | 16 | | | | | — | — |
| 14 | — | 15 | 15 | 16 | 16 | | | | | — | — |
| 15 | 11 | 15 | 15 | 16 | | | | | | — | — |

Fig. 14

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | 5 | 7 | 8 | — | — | — |
| 1 | — | 4 | 5 | 7 | 9 | 11 | 14 | 15 | — | — | — |
| 2 | — | 5 | 8 | 9 | 12 | 15 | 15 | 15 | — | — | — |
| 3 | — | 6 | 9 | 12 | 15 | 15 | 15 | 15 | — | — | — |
| 4 | — | 6 | 10 | 15 | 15 | 15 | 16 | 16 | — | — | — |
| 5 | — | 7 | 11 | 15 | 15 | 15 | 16 | | — | — | — |
| 6 | — | 7 | 12 | 15 | 15 | 15 | 16 | | — | — | — |
| 7 | — | 8 | 12 | 15 | 15 | 15 | 16 | | — | — | — |
| 8 | — | 9 | 15 | 15 | 15 | 15 | 16 | | — | — | — |
| 9 | — | 9 | 15 | 15 | 15 | 16 | 16 | | — | — | — |
| 10 | — | 9 | 15 | 15 | 15 | 16 | | | — | — | — |
| 11 | — | 10 | 15 | 15 | 15 | 16 | (16) | | — | — | — |
| 12 | — | 10 | 15 | 15 | 15 | 16 | | | — | — | — |
| 13 | — | 11 | 15 | 15 | 15 | 16 | | | — | — | — |
| 14 | — | 15 | 15 | 15 | 16 | 16 | | | — | — | — |
| 15 | 11 | 15 | 15 | 15 | 16 | | | | — | — | — |

Fig. 15

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | 5 | 7 | — | | | |
| 1 | — | 4 | 5 | 7 | 9 | 11 | 14 | — | | | |
| 2 | — | 5 | 7 | 9 | 12 | 14 | 14 | — | | | |
| 3 | — | 6 | 9 | 12 | 14 | 15 | 15 | — | | | |
| 4 | — | 6 | 10 | 15 | 15 | 15 | 15 | — | | | |
| 5 | — | 7 | 11 | 15 | 15 | 15 | 15 | — | | | |
| 6 | — | 7 | 12 | 15 | 15 | 15 | 15 | — | | | |
| 7 | — | 8 | 12 | 15 | 15 | 15 | 15 | — | | | |
| 8 | — | 9 | 15 | 15 | 15 | 15 | 15 | — | | | |
| 9 | — | 9 | 15 | 15 | 15 | 15 | 16 | — | | | |
| 10 | — | 9 | 15 | 15 | 15 | 15 | 16 | — | | | |
| 11 | — | 10 | 15 | 15 | 15 | 15 | 16 | — | | | |
| 12 | — | 10 | 15 | 15 | 15 | 15 | 16 | — | | | |
| 13 | — | 11 | 15 | 15 | 15 | 15 | 16 | — | | | |
| 14 | — | 15 | 15 | 15 | 15 | 16 | 16 | — | | | |
| 15 | 11 | 15 | 15 | 15 | 15 | 16 | 16 | — | | | |

Fig. 16

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | 5 | — | | | | |
| 1 | — | 4 | 5 | 6 | 9 | 11 | — | | | | |
| 2 | — | 5 | 7 | 9 | 12 | 13 | — | | | | |
| 3 | — | 6 | 9 | 12 | 13 | 14 | — | | | | |
| 4 | — | 6 | 10 | 14 | 15 | 15 | — | | | | |
| 5 | — | 7 | 11 | 14 | 15 | | — | | | | |
| 6 | — | 7 | 12 | 14 | 15 | | — | | | | |
| 7 | — | 8 | 12 | 14 | 15 | | — | | | | |
| 8 | — | 9 | 14 | 15 | 15 | | — | | | | |
| 9 | — | 9 | 14 | 15 | | | — | | | | |
| 10 | — | 9 | 14 | 15 | | | — | | | | |
| 11 | — | 10 | 15 | 15 | | | — | | | | |
| 12 | — | 10 | 15 | | | (15) | — | | | | |
| 13 | — | 11 | 15 | | | | — | | | | |
| 14 | — | 15 | 15 | | | | — | | | | |
| 15 | 11 | 15 | | | | | — | | | | |

Fig. 17

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 4 | 2 | 2 | 3 | 4 | — | | | | | |
| 1 | — | 4 | 4 | 6 | 9 | — | | | | | |
| 2 | — | 5 | 7 | 9 | 12 | — | | | | | |
| 3 | — | 6 | 9 | 12 | 12 | — | | | | | |
| 4 | — | 6 | 10 | 13 | 14 | — | | | | | |
| 5 | — | 7 | 10 | 14 | 14 | — | | | | | |
| 6 | — | 7 | 12 | 14 | 14 | — | | | | | |
| 7 | — | 8 | 12 | 14 | 14 | — | | | | | |
| 8 | — | 9 | 14 | 14 | 15 | — | | | | | |
| 9 | — | 9 | 14 | 14 | 15 | — | | | | | |
| 10 | — | 9 | 14 | 14 | 15 | — | | | | | |
| 11 | — | 10 | 14 | 15 | 15 | — | | | | | |
| 12 | — | 10 | 14 | 15 | 15 | — | | | | | |
| 13 | — | 11 | 14 | 15 | 15 | — | | | | | |
| 14 | — | 14 | 15 | 15 | 15 | — | | | | | |
| 15 | 11 | 14 | 15 | 15 | 15 | — | | | | | |

Fig. 18

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 3 | 2 | 2 | 3 | — | | | | | | |
| 1 | — | 4 | 4 | 6 | — | | | | | | |
| 2 | — | 5 | 7 | 8 | — | | | | | | |
| 3 | — | 6 | 9 | 11 | — | | | | | | |
| 4 | — | 6 | 10 | 13 | — | | | | | | |
| 5 | — | 7 | 10 | 13 | — | | | | | | |
| 6 | — | 7 | 11 | 13 | — | | | | | | |
| 7 | — | 8 | 12 | 13 | — | | | | | | |
| 8 | — | 9 | 13 | 14 | — | | | | | | |
| 9 | — | 9 | 14 | 14 | — | | | | | | |
| 10 | — | 9 | 14 | 14 | — | | | | | | |
| 11 | — | 10 | 14 | 14 | — | | | | | | |
| 12 | — | 10 | 14 | 14 | — | | | | | | |
| 13 | — | 11 | 14 | 14 | — | | | | | | |
| 14 | — | 14 | 14 | 14 | — | | | | | | |
| 15 | 11 | 14 | 14 | 14 | — | | | | | | |

Fig. 19

GROUP NUMBER

| | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 5 | 5 | 6 | 7 | 9 | 10 | 12 |
| 1 | — | 4 | 6 | 8 | 9 | 11 | 12 | 16 | 16 | 16 | 16 |
| 2 | — | 5 | 8 | 10 | 12 | 15 | 16 | 16 | | | |
| 3 | — | 5 | 8 | 10 | 12 | 16 | 16 | | | | |
| 4 | — | 6 | 9 | 16 | 16 | 16 | | | | | |
| 5 | — | 6 | 10 | 16 | | | | | | | |
| 6 | — | 7 | 11 | 16 | | | | | | | |
| 7 | — | 7 | 11 | 16 | | | | | | | |
| 8 | — | 8 | 16 | 16 | | | | (16) | | | |
| 9 | — | 9 | 16 | | | | | | | | |
| 10 | — | 9 | 16 | | | | | | | | |
| 11 | — | 9 | 16 | | | | | | | | |
| 12 | — | 9 | 16 | | | | | | | | |
| 13 | — | 11 | 16 | | | | | | | | |
| 14 | — | 14 | 16 | | | | | | | | |
| 15 | 10 | 15 | 16 | | | | | | | | |

RUN LENGTH

Fig. 20

GROUP NUMBER

| | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 5 | 5 | 6 | 7 | 9 | 10 | — |
| 1 | — | 4 | 6 | 8 | 9 | 11 | 12 | 15 | 16 | 16 | — |
| 2 | — | 5 | 8 | 10 | 11 | 15 | 15 | 16 | 16 | | — |
| 3 | — | 5 | 8 | 10 | 12 | 15 | 16 | 16 | | | — |
| 4 | — | 6 | 9 | 15 | 16 | 16 | 16 | | | | — |
| 5 | — | 6 | 10 | 15 | 16 | | | | | | — |
| 6 | — | 7 | 11 | 15 | 16 | | | | | | — |
| 7 | — | 7 | 11 | 15 | 16 | | | | | | — |
| 8 | — | 8 | 15 | 16 | 16 | | | | | | — |
| 9 | — | 9 | 15 | 16 | | | | (16) | | | — |
| 10 | — | 9 | 15 | 16 | | | | | | | — |
| 11 | — | 9 | 15 | 16 | | | | | | | — |
| 12 | — | 9 | 15 | 16 | | | | | | | — |
| 13 | — | 11 | 15 | 16 | | | | | | | — |
| 14 | — | 14 | 15 | 16 | | | | | | | — |
| 15 | 10 | 15 | 15 | 16 | | | | | | | — |

RUN LENGTH

Fig.21

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 5 | 5 | 6 | 7 | 9 | — | |
| 1 | — | 4 | 6 | 8 | 9 | 11 | 12 | 15 | 15 | — | |
| 2 | — | 5 | 8 | 9 | 11 | 15 | 15 | 15 | 16 | — | |
| 3 | — | 5 | 8 | 10 | 12 | 15 | 15 | 16 | 16 | — | |
| 4 | — | 6 | 9 | 15 | 15 | 16 | 16 | 16 | | — | |
| 5 | — | 6 | 10 | 15 | 15 | 16 | | | | — | |
| 6 | — | 7 | 11 | 15 | 15 | 16 | | | | — | |
| 7 | — | 7 | 11 | 15 | 15 | 16 | | | | — | |
| 8 | — | 8 | 15 | 15 | 16 | 16 | | | | — | |
| 9 | — | 9 | 15 | 15 | 16 | | | | | — | |
| 10 | — | 9 | 15 | 15 | 16 | | | (16) | | — | |
| 11 | — | 9 | 15 | 15 | 16 | | | | | — | |
| 12 | — | 9 | 15 | 15 | 16 | | | | | — | |
| 13 | — | 11 | 15 | 15 | 16 | | | | | — | |
| 14 | — | 14 | 15 | 15 | 16 | | | | | — | |
| 15 | 10 | 15 | 15 | 15 | 16 | | | | | — | |

Fig.22

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 5 | 5 | 6 | 7 | — | | |
| 1 | — | 4 | 6 | 8 | 8 | 11 | 12 | 14 | — | | |
| 2 | — | 5 | 8 | 9 | 11 | 15 | 15 | 15 | — | | |
| 3 | — | 5 | 8 | 10 | 12 | 15 | 15 | 15 | — | | |
| 4 | — | 6 | 9 | 15 | 15 | 15 | 15 | 16 | — | | |
| 5 | — | 6 | 10 | 15 | 15 | 15 | 16 | 16 | — | | |
| 6 | — | 7 | 11 | 15 | 15 | 15 | 16 | | — | | |
| 7 | — | 7 | 11 | 15 | 15 | 15 | 16 | | — | | |
| 8 | — | 8 | 15 | 15 | 15 | 16 | 16 | | — | | |
| 9 | — | 9 | 15 | 15 | 15 | 16 | | | — | | |
| 10 | — | 9 | 15 | 15 | 15 | 16 | | | — | | |
| 11 | — | 9 | 15 | 15 | 15 | 16 | | (16) | — | | |
| 12 | — | 9 | 15 | 15 | 15 | 16 | | | — | | |
| 13 | — | 11 | 15 | 15 | 15 | 16 | | | — | | |
| 14 | — | 14 | 15 | 15 | 15 | 16 | | | — | | |
| 15 | 10 | 15 | 15 | 15 | 15 | 16 | | | — | | |

Fig. 23

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 5 | 5 | 6 | — | | | |
| 1 | — | 4 | 6 | 8 | 8 | 11 | 12 | — | | | |
| 2 | — | 5 | 8 | 9 | 11 | 14 | 15 | — | | | |
| 3 | — | 5 | 8 | 10 | 12 | 14 | 15 | — | | | |
| 4 | — | 6 | 9 | 15 | 15 | 15 | 15 | — | | | |
| 5 | — | 6 | 10 | 15 | 15 | 15 | 15 | — | | | |
| 6 | — | 6 | 11 | 15 | 15 | 15 | 15 | — | | | |
| 7 | — | 6 | 11 | 15 | 15 | 15 | 15 | — | | | |
| 8 | — | 8 | 15 | 15 | 15 | 15 | 15 | — | | | |
| 9 | — | 9 | 15 | 15 | 15 | 15 | 16 | — | | | |
| 10 | — | 9 | 15 | 15 | 15 | 15 | 16 | — | | | |
| 11 | — | 9 | 15 | 15 | 15 | 15 | 16 | — | | | |
| 12 | — | 9 | 15 | 15 | 15 | 15 | 16 | — | | | |
| 13 | — | 11 | 15 | 15 | 15 | 15 | 16 | — | | | |
| 14 | — | 13 | 15 | 15 | 15 | 15 | 16 | — | | | |
| 15 | 10 | 15 | 15 | 15 | 15 | 15 | 16 | — | | | |

Fig. 24

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 5 | 5 | — | | | | |
| 1 | — | 4 | 5 | 8 | 8 | 11 | — | | | | |
| 2 | — | 5 | 8 | 9 | 11 | 14 | — | | | | |
| 3 | — | 5 | 8 | 10 | 11 | 14 | — | | | | |
| 4 | — | 6 | 9 | 14 | 14 | 14 | — | | | | |
| 5 | — | 6 | 10 | 14 | 15 | 15 | — | | | | |
| 6 | — | 6 | 11 | 14 | 15 | | — | | | | |
| 7 | — | 6 | 11 | 14 | 15 | | — | | | | |
| 8 | — | 8 | 14 | 15 | 15 | | — | | | | |
| 9 | — | 9 | 14 | 15 | | | — | | | | |
| 10 | — | 9 | 14 | 15 | | | — | | | | |
| 11 | — | 9 | 14 | 15 | | (15) | — | | | | |
| 12 | — | 9 | 15 | 15 | | | — | | | | |
| 13 | — | 11 | 15 | | | | — | | | | |
| 14 | — | 13 | 15 | | | | — | | | | |
| 15 | 10 | 15 | 15 | | | | — | | | | |

Fig. 25

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 4 | 4 | — | | | | | |
| 1 | — | 4 | 5 | 8 | 8 | — | | | | | |
| 2 | — | 5 | 8 | 9 | 10 | — | | | | | |
| 3 | — | 5 | 8 | 10 | 11 | — | | | | | |
| 4 | — | 6 | 9 | 13 | 13 | — | | | | | |
| 5 | — | 6 | 10 | 13 | 14 | — | | | | | |
| 6 | — | 6 | 11 | 14 | 14 | — | | | | | |
| 7 | — | 6 | 11 | 14 | 14 | — | | | | | |
| 8 | — | 8 | 14 | 14 | 15 | — | | | | | |
| 9 | — | 9 | 14 | 14 | 15 | — | | | | | |
| 10 | — | 9 | 14 | 14 | 15 | — | | | | | |
| 11 | — | 9 | 14 | 14 | 15 | — | | | | | |
| 12 | — | 9 | 14 | 15 | 15 | — | | | | | |
| 13 | — | 11 | 14 | 15 | 15 | — | | | | | |
| 14 | — | 13 | 14 | 15 | 15 | — | | | | | |
| 15 | 10 | 14 | 15 | 15 | 15 | — | | | | | |

Fig. 26

GROUP NUMBER

| RUN LENGTH | 0 | 1 | 2 | 3 | 4 | 5 | 6 | 7 | 8 | 9 | 10 |
|---|---|---|---|---|---|---|---|---|---|---|---|
| 0 | 2 | 2 | 3 | 3 | — | | | | | | |
| 1 | — | 4 | 5 | 7 | — | | | | | | |
| 2 | — | 5 | 8 | 9 | — | | | | | | |
| 3 | — | 5 | 8 | 9 | — | | | | | | |
| 4 | — | 6 | 9 | 12 | — | | | | | | |
| 5 | — | 6 | 10 | 13 | — | | | | | | |
| 6 | — | 6 | 10 | 13 | — | | | | | | |
| 7 | — | 6 | 11 | 13 | — | | | | | | |
| 8 | — | 8 | 13 | 13 | — | | | | | | |
| 9 | — | 9 | 14 | 14 | — | | | | | | |
| 10 | — | 9 | 14 | 14 | — | | | | | | |
| 11 | — | 9 | 14 | 14 | — | | | | | | |
| 12 | — | 9 | 14 | 14 | — | | | | | | |
| 13 | — | 11 | 14 | 14 | — | | | | | | |
| 14 | — | 13 | 14 | 14 | — | | | | | | |
| 15 | 10 | 14 | 14 | 14 | — | | | | | | |

IMAGE SIGNAL COMPRESSING DEVICE

This application is a continuation, of application Ser. No. 08/454,858, filed May 31, 1995, now abandoned.

BACKGROUND OF THE INVENTION

1. Field of the Invention

The present invention relates to an image signal compressing device for compressing a color still image in accordance with a JPEG (Joint Photographic Expert Group) algorithm.

2. Description of the Related Art

A standardized algorithm for the encoding of high resolution images and the transfer of that information through telecommunication transmission channels has been recommended by the JPEG. In the baseline process of the JPEG algorithm, to enable large-scale data compression, first the original image data are broken down into components on the spatial frequency axis by a two-dimensional DCT transformation. Second, the data expressed on the spatial frequency axis are quantized, and then the quantized data are encoded. According to the JPEG algorithm, it is recommended that such encoding be performed using a predetermined Huffman table.

However, since the distribution of the spatial frequencies of the image data varies greatly in accordance with the contents of the image, if the Huffman table recommended by JPEG is used, the image data is not necessarily fully compressed. Conversely, to perform the data compression more effectively, it is possible that a statistical process can be applied to data by applying a DCT transformation to find a distribution of the spatial frequencies and obtain an optimum Huffman table.

However, if a construction is adapted in which an optimum Huffman table is obtained, and then the original image is again compressed, then not only is the data compression process complicated, but also the processing time becomes long.

SUMMARY OF THE INVENTION

Accordingly, an object of the present invention is to provide an image signal compressing device by which image signal compression is efficiently performed by a simple process.

According to the present invention, there is provided an image signal compressing device comprising orthogonal transformation device, a quantization device, a data encoding table determining device and an encoding device.

The orthogonal transformation device, applies an orthogonal transformation to original image data to obtain orthogonal transformation coefficients. The quantization device quantizes the orthogonal transformation coefficients by a quantization table which is composed of quantization coefficients, so that quantized orthogonal transformation coefficients are obtained. The data encoding table determining device determines a predetermined data encoding table having a plurality of code words, each of the code words having a predetermined bit length. The predetermined data encoding table is determined in accordance with one of the quantization coefficients. The encoding device encodes the quantized orthogonal transformation coefficients using the predetermined data encoding table determined by the predetermined data encoding table determining device to form compressed image data.

BRIEF DESCRIPTION OF THE DRAWINGS

The present invention will be better understood from the description of the preferred embodiments of the invention set forth below, together with the accompanying drawings, in which:

FIG. 1 is a block diagram showing an image compression device of an embodiment of the present invention;

FIG. 2 are tables showing examples of image data P(Y)xy, a DCT transformation coefficient S(Y)uv, and a quantized DCT coefficient R(Y)uv in the embodiment;

FIG. 3 is a table of the grouping of differential values of a DC component;

FIG. 4 is a table of an encoding table of the DC component;

FIG. 7 is a table showing a grouping of the AC component;

FIG. 8 is an example of data encoded by Huffman encoding;

FIGS. 9A and 9B are examples of Huffman tables;

FIG. 10 is a view showing a relationship between the minimum value of the quantization coefficient and the Huffman code length table selected in accordance with the minimum value;

FIG. 11 shows a first Huffman code length table related to the AC components of the luminance signal;

FIG. 12 shows a second Huffman code length table related to the AC components of the luminance signal;

FIG. 13 shows a third Huffman code length table related to the AC components of the luminance signal;

FIG. 14 shows a fourth Huffman code length table related to the AC components of the luminance signal;

FIG. 15 shows a fifth Huffman code length table related to the AC components of the luminance signal;

FIG. 16 shows a sixth Huffman code length table related to the AC components of the luminance signal;

FIG. 17 shows a seventh Huffman code length table related to the AC components of the luminance signal;

FIG. 18 shows an eighth Huffman code length table related to the AC components of the luminance signal;

FIG. 19 shows a first Huffman code length table related to the AC components of the differential color signals;

FIG. 20 shows a second Huffman code length table related to the AC components of the differential color signals;

FIG. 21 shows a third Huffman code length table related to the AC components of the differential color signals;

FIG. 22 shows a fourth Huffman code length table related to the AC components of the differential color signals;

FIG. 23 shows a fifth Huffman code length table related to the AC components of the differential color signals;

FIG. 24 shows a sixth Huffman code length table related to the AC components of the differential color signals;

FIG. 25 shows a seventh Huffman code length table related to the AC components of the differential color signals;

FIG. 26 shows an eighth Huffman code length table related to the AC components of the differential color signals;

FIG. 27 shows first through eighth Huffman code length tables related to the DC component of the luminance signal; and FIG. 28 shows first through eighth Huffman code length tables related to the DC component of the differential color signals.

DESCRIPTION OF THE PREFERRED EMBODIMENTS

Figure 5:
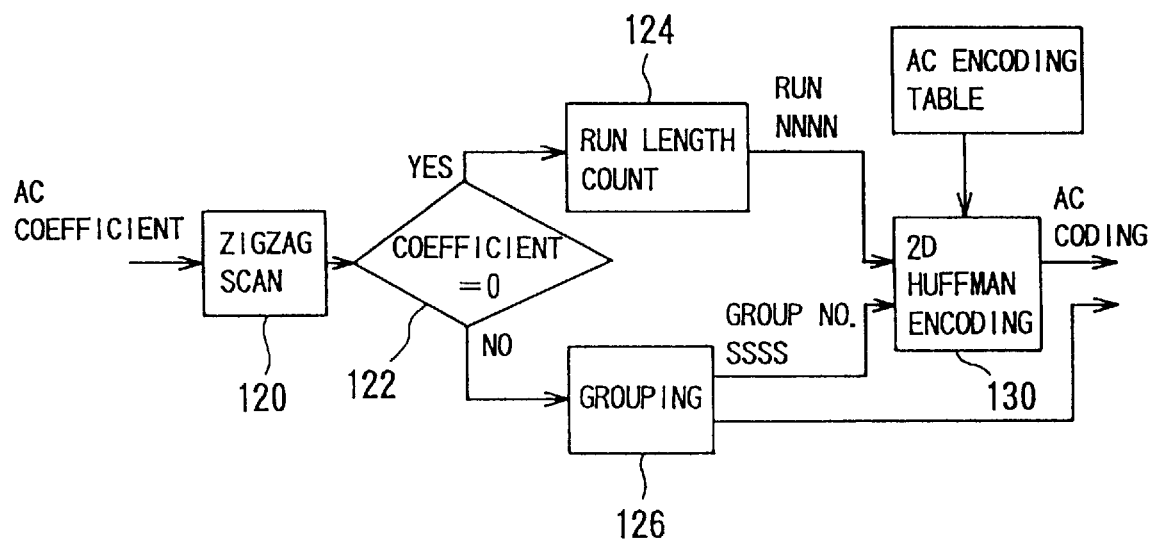
FIG. 5 is a flow chart of the processing routine for encoding a quantized AC component.
Figure 6:
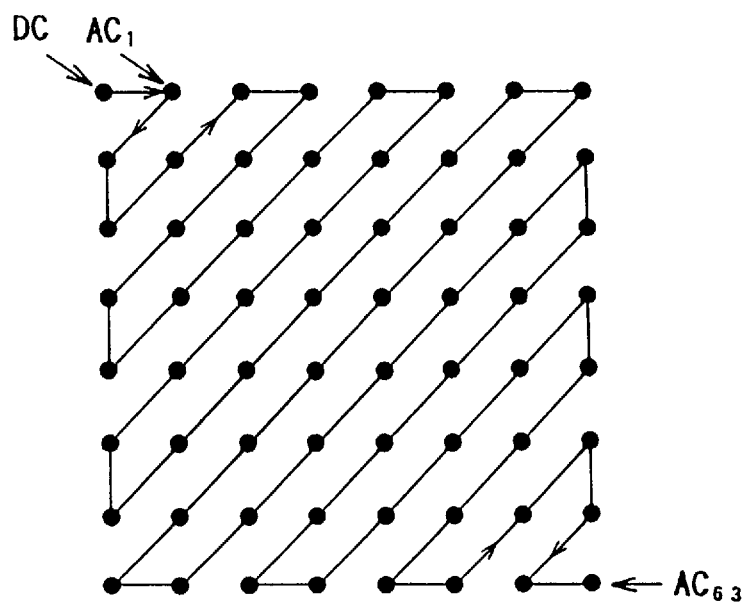
FIG. 6 illustrates the zigzag scan in Huffman encoding of the AC component.

The present invention will be described below with reference to embodiments shown in the drawings.

FIG. 1 is a block diagram of an image signal compressing device of an embodiment of the present invention.

Light coming from a subject S is converged by a condenser lens 11 and an image of the subject is formed on the light receiving surface of a CCD (charge coupled device) 12. On the light receiving surface of the CCD 12 are disposed a large number of photoelectric conversion elements. Further, on the top of each of the photoelectric conversion elements there is provided, for example, a color filter comprised of one of an R, G, or B color filter element. Each of these photoelectric conversion elements corresponds to a single pixel of data. The subject image is converted into electrical signals corresponding to predetermined colors by the photoelectric conversion elements, and these signals are then inputted into an A/D converter 13. Note that in the configuration of FIG. 1, only one CCD 12 is shown, but configurations with two or more CCDs are also possible.

The signals converted from an analog to digital format in the A/D converter 13 are converted into luminance signals Y and differential color signals Cb and Cr by a signal processing circuit, not shown, and are then inputted to an image memory 14. The image memory 14 is divided into mutually independent memory areas for storing the luminance signals Y and the differential color signals Cb and Cr separately. Each memory area has one image's worth of storage capacity.

The luminance signal Y and differential color signals Cb and Cr read out from the image memory 14 are inputted into a DCT processing circuit 21 for data compression processing. In the DCT processing circuit 21, the luminance signal Y and the rest of the original image data are subjected to a discrete cosine transformation (hereinafter referred to as "DCT"). That is, in this embodiment, a DCT transformation is utilized as the orthogonal transformation of the original image data. Note that in FIG. 1, the DCT processing circuit 21 is shown as a single processing circuit, but in actuality, independent DCT processing circuits are provided for the luminance signal Y and differential color signals Cb and Cr.

In the image compression device, including the DCT processing circuit 21, a quantization processing circuit 22, a Huffman encoding processing circuit 23 and a Huffman table selecting circuit 24, the luminance signal Y and the rest of the image data are divided into a plurality of blocks for one frame and are processed in units of blocks. Each block is comprised of an 8×8 matrix of pixel data.

The DCT coefficients of the luminance signal Y and the differential color signals Cb and Cr obtained in the DCT processing circuit 21 are inputted into the quantization processing circuit 22. The quantization processing circuit 22, like the DCT processing circuit 21, may be separately provided for each type of signal. The DCT coefficients of the luminance signal Y and the differential color signals Cb and Cr are inputted into the quantization processing circuit 22, and are quantized by quantization tables (T1 in FIG. 1) comprised of 8×8 matrices of quantization coefficients. The quantization is a linear quantization; that is, the DCT coefficients are divided by the corresponding quantization coefficients.

Note that in the embodiment, the quantization table used for the DCT coefficient of the luminance signal Y and the quantization table used for the quantization of the DCT coefficients of the differential color signals Cb and Cr are each different in accordance with the JPEG algorithm, but the same quantization table may be used for all signals.

The quantized DCT coefficients of the luminance signal Y and the differential color signals Cb and Cr outputted from the quantization processing circuit 22 are inputted into the Huffman encoding processing circuit 23 where they are then Huffman encoded by a predetermined algorithm. A Huffman table T2 used for the Huffman encoding is generated based on a Huffman code length table selected by a Huffman table selection unit 24, as described later. Namely, the Huffman code length table is provided for setting the bit length of a Huffman code, and a plurality of Huffman code length tables are stored in the Huffman table selection unit 24. Note that the Huffman code length table is selected based on a minimum quantization coefficient Qmin. Qmin is the minimum from among all the coefficients of the quantization table T1 used for compressing the original image data, as described later.

The image signals (Y', Cb', and Cr') obtained by this Huffman encoding are recorded in the IC memory card (a recording medium) M. When this image data is recorded in the IC memory card M, the quantization table T1 used in the quantization processing circuit 22 and the Huffman code length table T2 selected by the Huffman table selection unit 24 are also recorded in the IC memory card M as a part of the image data.

FIG. 2 shows as an example image data of a luminance signal P(Y)xy of an 8×8 block of pixels, DCT coefficients S(Y)uv, quantized DCT coefficients R(Y)uv, and a quantization table Q(Y)uv.

The image data P(Y)xy is converted to 64 (=8×8) DCT coefficients S(Y)uv by the two-dimensional DCT transformation. Of these DCT coefficients, the DCT coefficient $S(Y)_{00}$ at the position (0,0) is the DC (Direct Current) component, while the remaining 63 DCT coefficients S(Y) uv are the AC (Alternating Current) components. The AC components show how many higher spatial frequency components there are in the 8×8 pixel block of image data, from the coefficient $S(Y)_{01}$, and $S(Y)_{,10}$ to the coefficient $S(Y)_{77}$. The DC component shows the average value of the spatial frequency components of the 8×8 pixel block as a whole. Each DCT coefficient S(Y)uv corresponds to a predetermined spatial frequency.

The quantization table Q(Y)uv is used in the DCT processing circuit 22. Separate quantization tables Q(Y)uv may, for example, be used for the luminance signal Y and the differential color signals Cb and Cr. In this case, when recording the JPEG format image data in the IC memory card M, the content of the quantization table Q(Y)uv used for the quantization of the component data is also recorded, at an address corresponding to the address of the component data.

The equation for quantization of the DCT coefficients of S(Y)uv using the quantization table Q(Y)uv is defined as follows:

$$R(Y)uv = round(S(Y)uv/Q(Y)uv) (0 \leq u_3, v \leq 7)$$

"round" in this equation is an approximation function, which approximates to the nearest integer, the value of the argument. Namely, the quantized DCT coefficient R(Y)uv as shown in FIG. 2 is obtained by dividing each of the DCT coefficient S(Y)uv by the quantization coefficient Q(Y)uv, and rounding off.

The quantized DCT coefficients R(Y)uv, R(Cb)uv, and R(Cr)uv obtained in the quantization processing circuit 22 in this way are inputted to the Huffman encoding processing circuit 23.

Then, an explanation will be made of the Huffman encoding in the Huffman encoding processing circuit 23, using FIG. 3 through FIG. 7.

The encoding methods are different for the quantized DC component $R(Y)_{00}$, and the quantized AC components (i.e. the quantized DCT coefficients $R(Y)uv$ other than the quantized DC component $R(Y)_{00}$). The encoding of the quantized DC component $R(Y)_{00}$, is performed as follows:

First, the difference in value between the quantized DC component $R(Y)_{00}$ of the block currently to be encoded, and the value of the quantized DC component $R(Y)_{00}$ of the block previously encoded is obtained. It is judged in which group shown in FIG. 3 this difference falls. The code word corresponding to the number of the group is obtained from the encoding table (DC component encoding table) shown in FIG. 4. For example, if the quantized DC component $R(Y)_{00}$ of the block currently to be encoded is 16 and the quantized DC component $R(Y)_{00}$ of the block previously encoded is 25, the difference is −9, so it is judged from the group number table of FIG. 3 that the group number (SSSS) in which the difference −9falls is "4" and further, it is Judged from the encoding table of FIG. 4 that the code word of group number (SSSS) 4 is "101". Namely, the group number is provided for classifying the DC differential values.

Then, the group number that corresponds to the difference in the DC differential value sequence from the group number table of FIG. 3 is expressed by adding bits to the code word. For example, if the difference is −9, this corresponds to the seventh from the smallest in the group number (SSSS) 4, so the added bits are "0110", where the smallest group number would have added bits "0000". Namely, the Huffman code word of the quantized DC component $R(Y)_{00}$ of the block currently being encoded is "1010110".

On the other hand, the encoding of the quantized AC component is performed by the processing routine shown in FIG. 5. First, in step 120 the 63 quantized AC components are zigzag scanned in the order shown in FIG. 6 and are rearranged into one-dimensional array data. Then, in step 122, it is judged if each quantized AC component arranged one dimensionally is "0" or not. When a quantized AC component is "0", in step 124, the number of consecutive quantized AC components. eaqual to "0" are counted. From this, the length of consecutive "0"'s, that is, the run length (NNNN), is obtained.

Conversely, when it is judged in step 122 that the quantized AC component is not "0", in step 126, a process similar as with the quantized DC component is performed and the added bits are determined. This grouping of the quantized AC component differs from the grouping of the quantized DC component and is performed on the quantized AC component itself, rather than a difference. Namely, when the quantized AC component is for example "4", the table shown in FIG. 7 is referred to in order to obtain the group number (SSSS) 3. Further, the quantized AC component "4" is the fifth from the smallest in the group of the group number (SSSS) 3, so the added bits would be "100", where the smallest added bits are "000".

In step 130, the AC encoding table (FIG. 9A or 9B) of the Huffman table is referred to. When the run length of the data just before the quantized AC component "4" is 0, the code word "100" is obtained from the run length and the group number (SSSS) 3. Further, the two-dimensional Huffman code word "100100" is obtained by combining this code word "100" and the added bits "100" obtained in step 126.

The result of Huffman encoding of the quantized DCT coefficients of FIG. 2 is shown as the encoded data HED of FIG. 8.

FIGS. 9A and 9B show examples of the Huffman table for Huffman encoding of AC components of a luminance signal. FIG. 9A is an example recommended by JPEG, and FIG. 9B is an example of a Huffman table determined by this embodiment.

The Huffman tables have a column showing the run length and the group number (SSSS), a column showing the Huffman code word, and a column showing the code length (C.L. in the table), i.e., the bit length of the code word. Namely, the Huffman table includes a lot of Huffman code words having a predetermined bit length. The run length is obtained by Step 124 of FIG. 5, and the group number is obtained based on the table shown in FIG. 7. For example, when the run length is 0 and the group number is 9, the code word is "111111110000010" (16 bits) according to the Huffman table (FIG. 9A) recommended by JPEG. Conversely, according to the embodiment, as described later, a predetermined Huffman code length table is selected in accordance with the minimum value from among the quantization coefficients, so that the Huffman table shown in FIG. 9B, for example, is generated, and thus the corresponding code word is "111111111000000" (15 bits). Note that, even in the embodiment, the Huffman table recommended by JPEG may still be selected.

The values of the DCT coefficients outputted from the DCT processing circuit 21 are within the range between −1023 and 1023. Therefore, when the minimum value Qmin of the quantization coefficients is 10. For example, since the value of the quantization DCT coefficient falls between −102 and 102, the groups above group number "8" in the table of FIG. 7 are unnecessary. Namely, in this case, by restricting the group number to "7" or less, the code length of the Huffman code word is shortened.

Thus, a maximum value Gmax of the group numbers (SSSS) corresponds to the maximum value of the bit length of the Huffman code word, and is determined in accordance with the minimum value Qmin of the quantization coefficients, according to the following formula:

$$Gmax=round(log_2(1023/Qmin)+0.5)$$

For example, in the case of the quantization table shown in FIG. 2, since the minimum value Qmin of the quantization coefficient is "10", the maximum value Gmax of the group number is "7". One example of the Huffman code length tables is shown in FIG. 11. This Huffman table is provided for showing bit lengths of the Huffman code words, and the bit length is changed in accordance with the run length and the group number used for classifying the quantized DCT coefficients. The Huffman code word corresponding to the group number over the maximum value Gmax is omitted (reference DE in FIG. 12, for example). As described above, as the minimum value Qmin of the quantization coefficient is large, the absolute value of the quantized DCT coefficient becomes small, and therefore, the bit length of the Huffman code word can be shortened. Therefore, as the minimum value Qmin of the quantization coefficient is large, a Huffman code length table in which the maximum value Qmax of the group number is small can be selected.

FIG. 10 shows the relationship between the minimum value Qmin of the quantization coefficient and the number (i.e., selected table number) of the Huffman code length table selected in accordance with the minimim value Qmin. As described later, in this embodiment, eight Huffman code word length tables are provided for the AC components of each signal Y, Cr and Cb, and eight Huffman code word length tables are provided for the DC components of each signal Y, Cr and Cb. For example, in the quantization table shown in FIG. 2, since the minimum value Qmin of the quantization coefficient is 10, the selected table number is 4.

FIGS. 11 through 18 show first through eighth Huffman code length tables for the AC components of the luminance signal, and FIGS. 19 through 26 show first through eighth Huffman code length tables for the AC components of the differential color signals. FIG. 27 shows first through eighth Huffman code length tables for the DC component of the luminance signal, and FIG. 28 shows first through eighth Huffman code length tables for the DC component of the differential color signals.

In the Huffman code length tables for the AC components, numbers "0" through "10" of the top row show the group number, numbers "0" through "15" of the left row show the run length, and numbers "2", "3", . . . "16" in the table show the bit length of the Huffman code word. For example, in the AC component in which the run length is "1" and the group number is "6" in FIG. 11, the bit length of the Huffman code word is 16. In the Huffman code length table of the DC components, numbers "0" through "11" of the top column show the group number, and numbers "2", "3", . . . "11" in the table show the bit length of the Huffman code word.

The first Huffman code length shown in FIG. 11 is selected when the minimum value Qmin of the quantization coefficients is "1" or "2" as shown in FIG. 10, and corresponds to the Huffman table recommended by JPEG.

FIG. 12 is the second Huffman code length table, and is selected when the minimum value Qmin of the quantization coefficient is "3" or "4" as shown in FIG. 10. In the second Huffman code length table, the Huffman code words of group number "10" are not provided in comparison with the first Huffman code length table (FIG. 11). Namely, 16 code words of 16 bits are deleted (see reference DE), and thus, 16 of the remaining code words of 16 bits can be shortened to 15 bits.

In FIG. 9A, if the code word "1111111110000011" in which the run length and SSSS is "O/A"is deleted, then regarding the 16 bit code word "1111111110000010", this code word is not confused with the other code words even if the least significant bit "0" is omitted. In other words, "11111111100001" can be distinguished from the other code words. Namely, the code word "1111111110000010" can be changed to the 15 bit code word "111111111000001" with no confusion. Thus, even if any one 16 bit code word is deleted, other 16 bit code words, in which only the least significant bit is different in comparison with the deleted 16 bit code word, can be shortened to 15 bits. Therefore, when 16 code words of 16 bits are deleted the 16 code words of 16 bits can be shortened to 15 bits having only a different least significant bit.

In the example of FIG. 9B, the code words in which the run length and SSSS's are "0/A", "1/A", "2/A". . . are deleted, and thus, the bit lengths of the code words of "0/9", "1/6", "2/5" are shortened to 15 bits.

Note that, in this Huffman table, the maximum value among the 15 bit code words is "111111111010000". According to the rule for forming a code word in JPEG, 1 is added to the original code word and 0 is attached thereto as the least significant bit, so that the bit length is increased. Therefore, the minimum value of the 16 bit code words (the run length and SSSS is "1/7") is set to "1111111110100010" and the following 16 bit code words (the run lenght and SSSS is "1/8"and "1/9") are formed by adding successive one's to "111111111010010".

By shortening 16 bit code words to 15 bits, too many 15 bit code words may be formed. In such a case, by deleting two 16 bit code words, one 15 bit code word is shortened to 14 bits so that the number of 15 bit code words is reduced. For example, when 16 bit code words "1111111110100010" and "1111111110100011" are deleted, 15 bit code word "111111111010000" can be changed to 14 bit code word "11111111101000". Note that, when six 16 bit code words are deleted, one 15 bit code word can be shortened to a 13 bit code word. By such a method, the third Huffman code length table shown in FIG. 13 is obtained based on the second Huffman code length table, and similarly, the fourth through eighth Huffman code length tables are obtained.

The first through eighth Huffman code length tables for the AC component of the differential color signals shown in FIGS. 19 through 26 are obtained in accordance with a similar process to that of obtaining Huffman code length tables for the AC component of the luminance signal.

Regarding the DC component, since there are fewer Huffman code words as understood from FIG. 4, fewer code words can be deleted than with the AC component. Namely, as shown in FIGS. 27 and 28, the Huffman code length tables are different from each other only in the maximum value Gmax of the group number, and shortening of the code word is not as effective as with the AC component. Note that, in FIGS. 27 and 28, the number shown at the left side of each table indicates the selected table number.

Note that the Huffman code length tables shown in FIGS. 11 through 28 are stored in a memory (not shown) provided in the Huffman table selecting circuit 24.

As described above, according to the embodiment, by selecting a Huffman code length table in accordance with the value of a quantized coefficient of the quantization table, an optimum (i.e. smaller) Huffman table can be obtained. Namely, according to the embodiment, to obtain the optimum Huffman table it is not necessary to apply a statistical process to the quantized DCT coefficients, and the image data can be effectively compressed by a simple process in a short time without reducing the quality of the original image.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-140865 (filed on May 31, 1994) and is expressly incorporated herein, by reference, in its entirety.

I claim:

1. An image signal compressing device comprising:

orthogonal transformation means for applying an orthogonal transformation to original image data to obtain orthogonal transformation coefficients;

a quantization processor which quantizes said orthogonal transformation coefficients, using a quantization table comprising quantization coefficients, to obtain quantized orthogonal transformation coefficients;

a data encoding table determination processor which determines a data encoding table having a plurality of code words, each of said plurality of code words having a predetermined bit length, a maximum bit length of said plurality of code words being determined in accordance with a minimum value of said quantization coefficients; and encoding means for encoding said quantized orthogonal transformation coefficients using said predetermined data encoding table to form compressed image data.

2. An image signal compressing device according to claim 1, wherein said data encoding table determination processor includes a plurality of code word length tables for setting a plurality of bit lengths of said code words, said encoding table determination processor selecting one of said plurality of code word length tables in accordance with a value of one of said quantization coefficients.

3. An image signal compressing device according to claim 1, wherein said code word length table has at least two parameters, one of said two parameters being a group number which classifies said orthogonal transformation coefficients, and the other of said two parameters being a run length which is a length of consecutive zeros of said quantized orthogonal transformation coefficients.

4. An image signal compressing device according to claim 1, further comprising a recording processor which records said code word length table selected by said data encoding table determining processor.

5. An image signal compressing device according to claim 1, wherein said orthogonal transformation is a discrete cosine transformation.

6. An image signal compressing device according to claim 1, wherein said predetermined data encoding table is a Huffman table, and said encoding means encodes said quantized orthogonal transformation coefficients using said Huffman table.

7. An image signal compressing device in which original image data is transformed to orthogonal transformation coefficients, said orthogonal transformation coefficients being quantized by a quantization table comprising quantization coefficients to obtain orthogonal transformation coefficients, said image signal compressing device comprising:

Huffman table determining means for determining a Huffman table having a plurality of code words, each of said plurality of codes words having a predetermined bit length, a maximum bit length of said code words being determined in accordance with a minimum value of said quantization coefficients; and encoding means for encoding said quantized orthogonal transformation coefficients, using said determined Huffman table, to form compressed image data.

8. An image signal compression device, comprising:

an orthogonal transformation device which applies an orthogonal transformation to original image data to obtain orthogonal transformation coefficients;

a quantization device which quantizes said orthogonal transformation coefficients, using a quantization table comprising quantization coefficients, to obtain quantized orthogonal transformation coefficients;

a data encoding table determination device which determines a data encoding table having a plurality of code words, each of said plurality of code words having a predetermined bit length, a maximum bit length of said code words bing determined in accordance with a value of said quantization coefficients; and an encoding device which encodes said quantized orthogonal transformation coefficients, using said data encoding table, to form compressed image data.

9. The image signal compression device according to claim 8, wherein said data encoding table determining device determines said one of said plurality of predetermined data encoding tables in accordance with a minimum value of said quantization coefficients.

10. The image signal compression device according to claim 8, wherein said data encoding table determining device comprises a plurality of code word length tables for setting a plurality of bit lengths of said code words, said data encoding table determining device selecting one of said code word length tables in accordance with a minimum value of said quantization coefficients.

11. The image signal compressing device according to claim 8, wherein said code word length table has at least two parameters, one of said two parameters being a group number which classifies said orthogonal transformation coefficients, and the other of said two parameters being a run length, said run length being a length of consecutive zeros of said quantized orthogonal transformation coefficients.

12. The image signal compression device according to claim 8, wherein said data encoding table determining device stores said code word length table.

13. The image signal compression device according to claim 8, wherein said orthogonal transformation is a discrete cosine transformation.

14. The image signal compression device according to claim 8, wherein said predetermined data encoding table is a Huffman table, and wherein said encoding device encodes said quantized orthogonal transformation coefficients using said Huffman table.

15. An image signal compression device in which original image data is transformed to orthogonal transformation coefficients, said orthogonal transformation coefficients being quantized by a quantization table comprising quantization coefficients to obtain quantized orthogonal transformation coefficients, said image signal compression device comprising:

a Huffman table determining device which determines a Huffman table in accordance with a minimum value of said quantization coefficients, said Huffman table having a plurality of Huffman code words, each of said plurality of code words having a predetermined bit length; and an encoding device which encodes said quantized orthogonal transformation coefficients using said Huffman table to form compressed image data.

* * * * *